US012757290B2

(12) United States Patent
Wang et al.

(10) Patent No.: US 12,757,290 B2
(45) Date of Patent: Oct. 6, 2026

(54) METHOD AND APPARATUS FOR PARAMETER CONFIGURATION, NETWORK DEVICE, AND TERMINAL

(71) Applicant: GUANGDONG OPPO MOBILE TELECOMMUNICATIONS CORP., LTD., Dongguan (CN)

(72) Inventors: Shukun Wang, Dongguan (CN); Jianhua Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/807,798

(22) Filed: Aug. 16, 2024

(65) Prior Publication Data

US 2024/0407041 A1 Dec. 5, 2024

Related U.S. Application Data

(63) Continuation of application No. 17/343,518, filed on Jun. 9, 2021, now Pat. No. 12,096,205, which is a (Continued)

(51) Int. Cl.
*H04W 76/28* (2018.01)
*H04W 76/27* (2018.01)

(Continued)

(52) U.S. Cl.
CPC ........... *H04W 76/28* (2018.02); *H04W 76/27* (2018.02); *H04W 76/30* (2018.02); *H04W 74/0833* (2013.01)

(58) Field of Classification Search
CPC ..... H04W 76/28; H04W 76/27; H04W 76/30; H04W 74/0833; H04W 52/0216;

(Continued)

(56) References Cited

U.S. PATENT DOCUMENTS

2016/0262129 A1 9/2016 Better
2016/0295504 A1* 10/2016 Wang .................... H04W 68/02

(Continued)

FOREIGN PATENT DOCUMENTS

CN 108632949 A 10/2018
CN 108713337 A 10/2018

(Continued)

OTHER PUBLICATIONS

Interdigital Inc. "Update and Conclusion on solution 38: eDRX in RRC Inactive" SA WG2 Meeting #S2-129 S2-1811081, Oct. 19, 2018, main body, section 6.38.

(Continued)

*Primary Examiner* — Kiet Tang
(74) *Attorney, Agent, or Firm* — Ladas & Parry, LLP

(57) ABSTRACT

Provided in the embodiments of the disclosure are methods and apparatuses for parameter configuration, a network device, and a terminal device. The method includes that: a first base station receives first indication information and/or first configuration information from a terminal device in a connected state. The first indication information indicates the terminal device uses or supports an extended Discontinuous Reception (eDRX) operation in an inactive state, and the first configuration information includes an eDRX configuration parameter configured by the terminal device; and the first base station configures a first eDRX configuration parameter for the terminal device based on the first indication information and/or the first configuration information, the first eDRX configuration parameter is an eDRX configuration parameter corresponding to the inactive state.

16 Claims, 14 Drawing Sheets

Related U.S. Application Data continuation of application No. PCT/CN2018/121334, filed on Dec. 14, 2018.

(51) Int. Cl.
*H04W 76/30* (2018.01)
*H04W 74/0833* (2024.01)

(58) Field of Classification Search
CPC ..... H04W 24/02; H04W 72/51; H04W 68/02; Y02D 10/00; Y02D 30/70; G06F 1/3206; G06F 1/3278
See application file for complete search history.

(56) References Cited

U.S. PATENT DOCUMENTS

| | | | | |
|---|---|---|---|---|
| 2017/0006520 | A1 * | 1/2017 | Quan .................... | H04W 36/34 |
| 2017/0048842 | A1 | 2/2017 | Han et al. | |
| 2017/0099649 | A1 * | 4/2017 | Vos ........................ | H04W 72/51 |
| 2018/0098297 | A1 * | 4/2018 | Yu ...................... | H04W 52/0216 |
| 2019/0007124 | A1 * | 1/2019 | Seo ........................ | H04L 5/0044 |

FOREIGN PATENT DOCUMENTS

| | | | |
|---|---|---|---|
| CN | 108738139 | A | 11/2018 |
| JP | 2018074522 | A | 5/2018 |
| KR | 20180033443 | A | 4/2018 |
| WO | 2017026188 | A1 | 2/2017 |
| WO | 2018063467 | A1 | 4/2018 |
| WO | 2020118726 | A1 | 6/2020 |

OTHER PUBLICATIONS

CATT. "Paging in Extended DRX for Light Connection" 3GPP TSG-RAN WG2 Meeting #96 R2-168164, Nov. 18, 2016, main body, section 2.

International Search Report of the International Application No. PCT/CN2018/121334, mailed on Sep. 12, 2019 with English translation provided by WIPO.

Written Opinion of the International Searching Authority in International Application No. PCT/CN2018/121334, mailed on Sep. 12, 2019 with English translation provided by WIPO and Google Translate.

Qualcomm Incorporated et al., "Overall evaluation and conclusion for Key issue 4 Track 1 (extended DRX support in RRC-Inactive/CM-Connected)", SA WG2 Meeting #129 S2-1810066, Dongguan, P.R. China, Oct. 15-19, 2018.

Supplementary European Search Report in the European Patent Application No. 18942949.1, mailed on Dec. 8, 2021.

First Office Action of the Chinese Patent Application No. 202310248658.3, issued on Jul. 12, 2024.

Non-Final Office Action of the U.S. Appl. No. 17/343,518, issued on Dec. 4, 2023.

Notice of Allowance of the U.S. Appl. No. 17/343,518, issued on May 17, 2024.

Notice of Allowability of the U.S. Appl. No. 17/343,518, issued on Jun. 11, 2024.

Notice of Allowability of the U.S. Appl. No. 17/343,518, issued on Jul. 15, 2024.

Ericsson, "eDRX with RRC Inactive—solution update and evaluation", SA WG2 Meeting #128BIS, S2-188389, Aug. 20-24, 2018, Sophia Antipolis, France.

Second Office Action and search report for the Chinese Patent Application No. 202310248658.3, issued on Oct. 8, 2024.

Office Action for the European Patent Application No. 18942949.1, issued on Nov. 22, 2024.

Second Office Action of the corresponding European patent application No. 18942949.1, issued on Jul. 31, 2026.

* cited by examiner

METHOD AND APPARATUS FOR PARAMETER CONFIGURATION, NETWORK DEVICE, AND TERMINAL

CROSS-REFERENCE TO RELATED APPLICATIONS

This application is a continuation of U.S. application Ser. No. 17/343,518 filed on Jun. 9, 2021, which is a continuation application of International Patent Application No. PCT/CN2018/121334 filed on Dec. 14, 2018, the disclosures of which are incorporated herein by reference in their entireties.

BACKGROUND

In order to meet demands of people on the rate, delay, high-speed mobility and energy efficiency of services as well as the diversity and complexity of the services in future life, the 3rd Generation partnership Project (3GPP) international standard organizations start to research and develop 5th Generation (5G) mobile communication technologies.

In 5G network environments, a novel Radio Resource Control (RRC) state, i.e., an RRC inactive (RRC_INACTIVE) state, is defined for reducing radio signaling, quickly resuming wireless connections and quickly restoring data services. Such a state is different from an RRC idle (RRC_IDLE) state and an RRC connected (RRC_CONNECTED) state.

In a case where a terminal device in the RRC_INACTIVE state is to receive an initial paging message of a Radio Access Network (RAN), for example, downlink data reaches an anchor base station (the base station is a base station node for storing context of User Equipment (UE)), an extended Discontinuous Reception (eDRX) configuration parameter may be configured for the terminal device in the RRC_INACTIVE state in order to save energy and electricity. How to enable a terminal device in the RRC_INACTIVE state to support an eDRX configuration parameter is to be clarified.

SUMMARY

Embodiments of the disclosure relate to the technical field of mobile communications, and more particularly to a method and apparatus for parameter configuration, a network device, and a terminal device.

A method for parameter configuration provided by the embodiments of the disclosure may include the following operations.

A first base station receives at least one of first indication information or first configuration information from a terminal device in a connected state. The first indication information indicates the terminal device uses or supports an eDRX operation in an inactive state, and the first configuration information includes an eDRX configuration parameter configured by the terminal device.

The first base station configures a first eDRX configuration parameter for the terminal device based on at least one of the first indication information or the first configuration information. The first eDRX configuration parameter is an eDRX configuration parameter corresponding to the inactive state.

A method for parameter configuration provided by the embodiments of the disclosure may include the following operation.

A terminal device sends at least one of first indication information or first configuration information to a first base station after entering a connected state. The first indication information indicates the terminal device uses or supports an eDRX operation in an inactive state, and the first configuration information includes an eDRX configuration parameter configured by the terminal device.

At least one of the first indication information or the first configuration information is configured for the first base station to configure a first eDRX configuration parameter for the terminal device, and the first eDRX configuration parameter is an eDRX configuration parameter corresponding to the inactive state.

A method for parameter configuration provided by the embodiments of the disclosure may include the following operation.

An anchor base station notifies, when triggering at least one target base station in an RAN paging region to send first paging scheduling information and/or a first paging message, the at least one target base station of using a first eDRX configuration parameter to send the first paging scheduling information and/or the first paging message. The first eDRX configuration parameter is an eDRX configuration parameter corresponding to an inactive state.

An apparatus for parameter configuration provided by the embodiments of the disclosure may include: a receiving unit and a configuring unit.

The receiving unit is configured to receive at least one of first indication information or first configuration information from a terminal device in a connected state. The first indication information indicates the terminal device uses or supports an eDRX operation in an inactive state, and the first configuration information includes an eDRX configuration parameter configured by the terminal device.

The configuring unit is configured to configure a first eDRX configuration parameter for the terminal device based on at least one of the first indication information or the first configuration information. The first eDRX configuration parameter is an eDRX configuration parameter corresponding to the inactive state.

An apparatus for parameter configuration provided by the embodiments of the disclosure may include a sending unit.

The sending unit is configured to send at least one of first indication information or first configuration information to a first base station after a terminal device enters a connected state. The first indication information indicates the terminal device uses or supports an eDRX operation in an inactive state, and the first configuration information includes an eDRX configuration parameter configured by the terminal device.

At least one of the first indication information or the first configuration information is configured for the first base station to configure a first eDRX configuration parameter for the terminal device, and the first eDRX configuration parameter is an eDRX configuration parameter corresponding to the inactive state.

An apparatus for parameter configuration provided by the embodiments of the disclosure may include a trigger unit and a notification unit.

The trigger unit is configured to trigger at least one target base station in an RAN paging region to send first paging scheduling information and/or a first paging message.

The notification unit is configured to notify the at least one target base station of using a first eDRX configuration parameter to send the first paging scheduling information and/or the first paging message. The first eDRX configuration parameter is an eDRX configuration parameter corresponding to an inactive state.

A network device provided by the embodiments of the disclosure may include a processor and memory. The memory is configured to store a computer program, and the processor is configured to call and run the computer program stored in the memory to implement the above method for parameter configuration.

A terminal device provided by the embodiments of the disclosure may include a processor and memory. The memory is configured to store a computer program, and the processor is configured to call and run the computer program stored in the memory to implement the above method for parameter configuration.

A chip provided by the embodiments of the disclosure is configured to implement the above methods for parameter configuration.

Specifically, the chip may include: a processor, configured to call and run a computer program in memory to enable a device installed with the chip to implement the above methods for parameter configuration.

A computer-readable storage medium provided by the embodiments of the disclosure stores a computer program enabling a computer to implement the above method for parameter configuration.

A computer program product provided by the embodiments of the disclosure may include computer program instructions enabling a computer to implement the above method for parameter configuration.

A computer program provided by the embodiments of the disclosure may run in a computer to enable the computer to implement the above methods for parameter configuration.

With the above technical solutions, a network side may configure a eDRX configuration parameter for a terminal device in an inactive state (inactive UE), such that the terminal device may use the eDRX configuration parameter to implement the eDRX operation when entering the inactive state, thereby saving the electricity of the terminal device and not affecting the latency of a service.

BRIEF DESCRIPTION OF THE DRAWINGS

The accompanying drawings are described here to provide a further understanding of the disclosure, and form a part of the disclosure. The schematic embodiments and description of the disclosure are adopted to explain the disclosure, and do not form improper limits to the disclosure. In the drawings.

DETAILED DESCRIPTION

The technical solutions in the embodiments of the disclosure will be described below in combination with the drawings in the embodiments of the disclosure. It is apparent that the described embodiments are not all embodiments but a part of embodiments of the disclosure. All other embodiments obtained by those of ordinary skill in the art based on the embodiments in the disclosure without creative work shall fall within the scope of protection of the disclosure.

The technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system or a 5G system.

Figure 1:
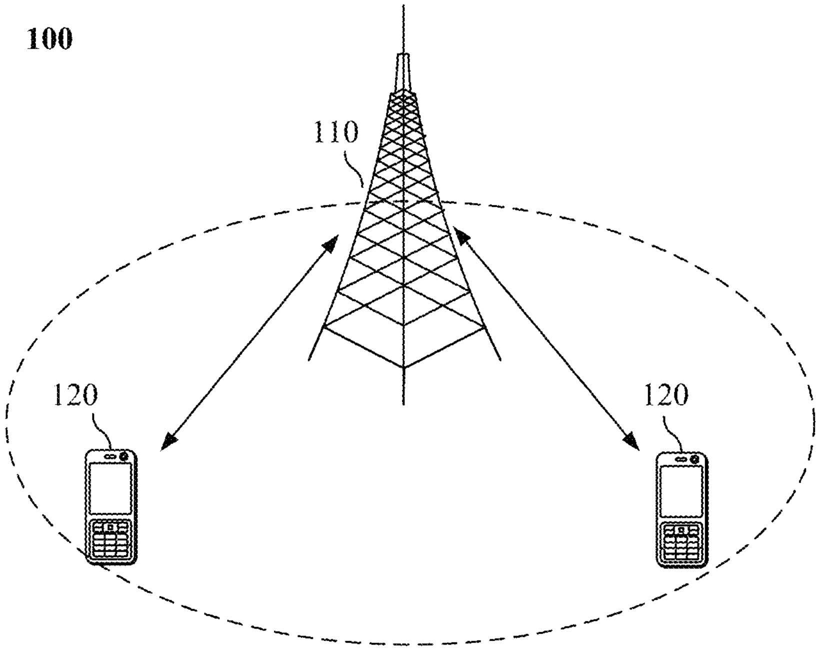
FIG. 1 is a schematic diagram of a communication system architecture according to an embodiment of the disclosure.

In an example, the communication system 100 to which the embodiments of the disclosure are applied is as shown in FIG. 1. The communication system 100 may include a network device 110. The network device 110 may be a device communicating with a terminal device 120 (or called a communication terminal device and a terminal device). The network device 110 may provide communication coverage for a specific geographical region and may communicate with the terminal device under the coverage. In some implementations, the network device 110 may be a Base Transceiver Station (BTS) in a GSM system or a CDMA system, may also be a NodeB (NB) in the WCDMA system, and may further be an Evolutional Node B (eNB or eNodeB) in an LTE system or a wireless controller in a Cloud Radio Access Network (CRAN). Or the network device may be a mobile switching center, a relay station, an access point, a vehicle-mounted device, a wearable device, a concentrator, a switch, a network bridge, a router, a network-side device in a 5G network, a network device in a future evolved PLMN or the like.

The communication system 100 may also include at least one terminal device 120 within the coverage of the network device 110. The "terminal device" used herein includes, but not limited to, connection via a wired circuit, such as connection via Public Switched Telephone Networks (PSTN), a Digital Subscriber Line (DSL), a digital cable and a direct cable; and/or another data connection/network; and/or a wireless interface, for example, for a cellular network and a Wireless Local Area Network (WLAN) such as a digital television network of a Digital Video Broadcasting-Handheld (DVB-H) network, a satellite network and an Amplitude Modulation-Frequency Modulation (AM-FM) broadcast transmitter; and/or an apparatus of another terminal device that is configured to receive/send a communication signal; and/or an Internet of Things (IOT) device. The terminal device configured to communicate through the wireless interface may be called a "wireless communication terminal device", a "wireless terminal device" or a "mobile terminal device". Examples of the mobile terminal device include, but not limited to, a satellite or cell phone; a Personal Communication System (PCS) terminal device that can combine a cellular radiotelephone, data processing, facsimile, and data communications capabilities; a radiotelephone, a pager, an Internet/Intranet access, a Web browser, a memo pad, a calendar, and/or a PDA equipped with a Global Positioning System (GPS) receiver, and a common laptop and/or palm type receiver or some other electronic devices including a transmitter-receiver radiotelephone. The terminal device may refer to an access terminal device, UE, a user unit, a user station, a mobile station, a mobile radio station, a remote station, a remote terminal device, a mobile device, a user terminal device, a terminal device, a wireless communication device, a user agent or a user device. The access terminal device may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in a 5G network, a terminal device in a future evolved PLMN or the like.

In some implementations, the terminal device 120 may perform Device to Device (D2D) communication.

In some implementations, the 5G system or 5G network may also be called an NR system or an NR network.

A network device and two terminal devices are shown in FIG. 1 as an example. In some implementations, the communication system 100 may include multiple network devices and another number of terminal devices that may be included under coverage of each network device. There are no limits made thereto in the embodiments of the disclosure.

In some implementations, the communication system 100 may also include another network entity such as a network controller and a mobility management entity. There are no limits made thereto in the embodiments of the disclosure.

It is to be understood that the device having the communication function in the network/system in the embodiments of the disclosure may be referred to as a communication device. With the communication system 100 shown in FIG. 1 as an example, the communication device may include the network device 110 and the terminal device 120, both of which have the communication function. The network device 110 and the terminal device 120 are the above-described specific devices and will not be elaborated herein. The communication device may further include other devices in the communication system 100, such as a network controller, a mobile management entity and other network entities. There are no limits made thereto in the embodiments of the disclosure.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

For the ease of understanding on the technical solutions of the embodiments of the disclosure, related concepts involved in the embodiments of the disclosure will be described below.

The technical solutions in the embodiments of the disclosure are mainly applied to 5G mobile communication systems. Certainly, the technical solutions in the embodiments of the disclosure are not limited to the 5G mobile communication systems, and may also be applied to other types of mobile communication systems. Main disclosure scenarios of the 5G mobile communication technologies include: Enhance Mobile Broadband (eMBB), Ultra Reliable Low Latency Communication (URLLC) and massive Machine Type Communication (mMTC). Descriptions are made below to the main disclosure scenarios in the 5G mobile communication systems.

1) eMBB scenario: the eMBB aims to make users obtain multimedia contents, services and data, with the service requirement increasing very rapidly. As the eMBB may be deployed in different scenarios such as rooms, urban areas and rural areas, there is a big difference in service capability and requirement and the services must be analyzed in combination with specific deployment scenarios.

2) URLLC scenario: the URLLC is typically applied to industrial automation, power automation, remote medical operation, traffic safety guarantee and the like.

3) mMTC scenario: typical features of the URLLC include a high connection density, a small data size, a delay insensitive service, a low cost and long service life of modules, and the like.

In 5G network environments, a novel RRC state, i.e., an RRC inactive (RRC_INACTIVE) state, is defined for reducing radio signaling, quickly resuming wireless connections, and quickly restoring data services. Such a state is different from an RRC idle (RRC_IDLE) state and an RRC connected (RRC_CONNECTED) state.

The three RRC states in the 5G network environments will be described below.

1) RRC_IDLE state: mobility is based on cell selection and reselection of UE, paging is initiated by a Core Network (CN), and a paging region is configured by the CN. The base station is provided with neither a UE Access Stratum (AS) context nor a RRC connection.
2) RRC_CONNECTED state: there is a RRC connection as well as a UE AS context of a base station and UE. The network side knows which cell the UE is residing in. The mobility is controlled by the network side. Unicast data may be transmitted between the UE and the base station.
3) RRC_INACTIVE state: mobility is based on cell selection and reselection of the UE, connection is provided between a CN and a RAN, a UE AS context is present on a base station, paging is triggered by a RAN, a paging region based on the RAN is managed by the RAN, and a network side knows the location of UE based on the paging region of the RAN.

Figure 2:
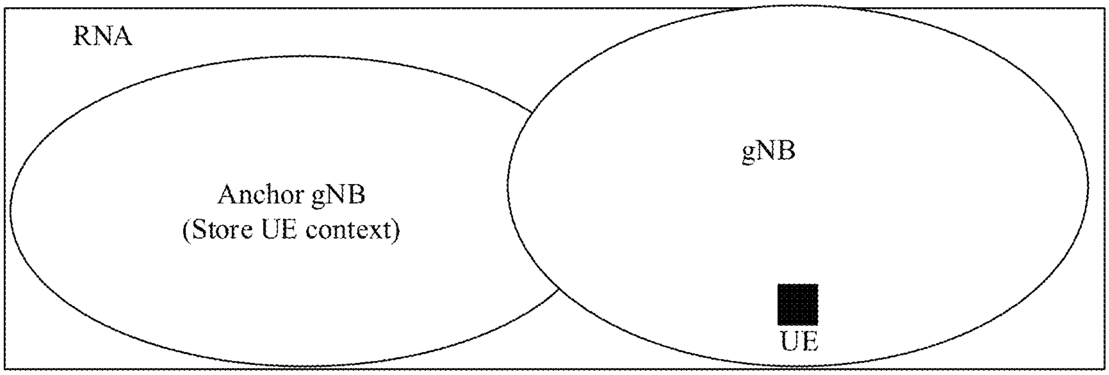
FIG. 2 is a schematic diagram of an RAN according to an embodiment of the present disclosure.

When UE is in the RRC_INACTIVE state, a network side may configure a RAN paging region for the UE through dedicated signaling, and the RAN paging region may be one cell or multiple cells, as shown in FIG. 2. When the UE moves in the region, the network side is not needed to be notified. In this case, a mobility behavior in the idle state, i.e., a cell selection and reselection principle, is followed. When the UE moves out of the paging region configured by the RAN, the UE may be triggered to resume RRC connection and re-acquire the paging region configured by the RAN. When downlink data reaches the UE, the base station (such as a gNB) for keeping the connection between the RAN and a CN for the UE may trigger all cells in the RAN paging region to send a paging message to the UE, such that the UE in the INACTIVCE state can resume the RRC connection for data reception.

Hence, there are three cases that the UE enters the RRC connected state from the INACTIVCE state.

First, the UE has reached downlink data and the network side initiates paging to the RAN side, thereby promoting the UE to enter the connected state.

Second, the UE initiates updating of region of a RAN location, for example, periodically updating the RAN location or updating the position in a cross-region mode.

Third, the UE has uplink data to be transmitted to cause the UE to enter the connected state.

Figure 3:
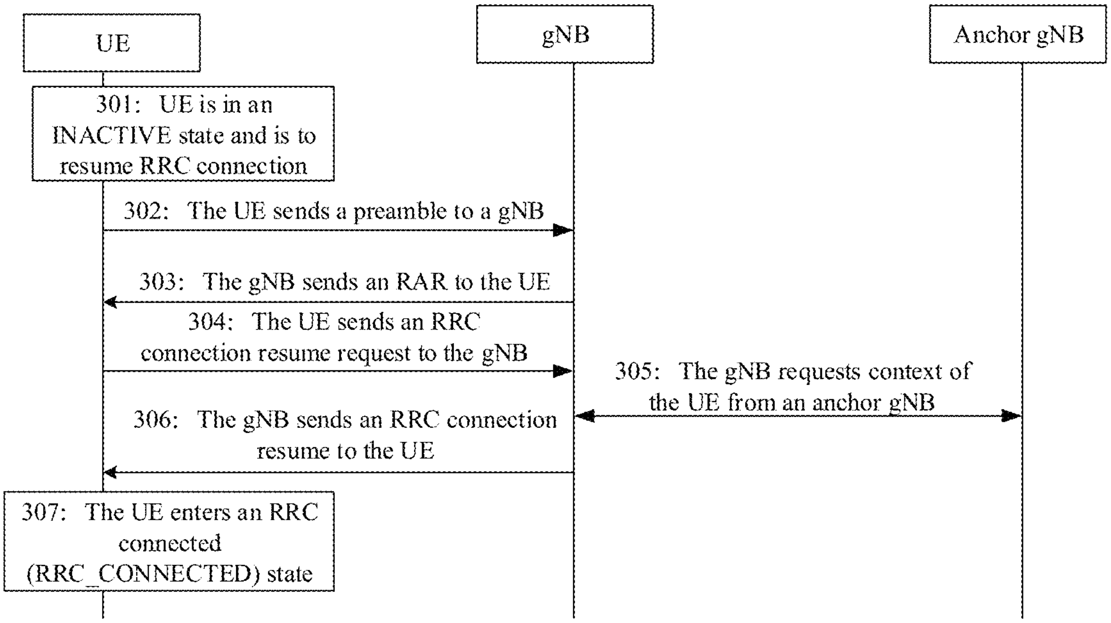
FIG. 3 is a schematic diagram of an RRC connection resuming process according to an embodiment of the present disclosure.

FIG. 3 is a schematic diagram of an RRC connection resuming process. As shown in FIG. 3, the RRC connection resuming process may include the following operations.

At operation 301: UE is in an INACTIVE state and is to resume an RRC connection.

At operation 302: the UE sends a preamble to a gNB.

At operation 303: the gNB sends a Random Access Response (RAR) to the UE.

At operation 304: the UE sends an RRC connection resume request to the gNB.

At operation 305: the gNB requests context of the UE from an anchor gNB.

At operation 306: the gNB sends an RRC connection resume to the UE.

At operation 307: the UE enters an RRC connected (RRC_CONNECTED) state.

In order to reduce the power consumption of a terminal device and prolongs the standby time of the terminal device, an eDRX concept is introduced to the Release 13. A DRX cycle in the idle state is less than one System Frame Number (SFN), i.e., 10.24 s. However, in order to save the electricity of the terminal device, a longer DRX cycle is introduced. The DRX cycle in the idle state exceeds 10.24 s, and is 43.69 min at maximum. In order to support such a DRX configuration, there is a need for introduction of a Hyper-SFN (H-SFN) concept.

Figure 4:
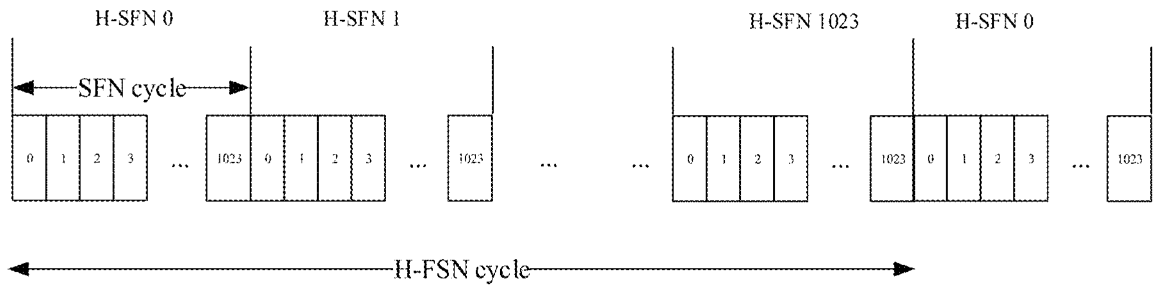
FIG. 4 is a schematic diagram of an Hyper-System Frame Number (H-SFN) according to an embodiment of the present disclosure.

Referring to FIG. 4, one SFN is 10 ms, and the SFN ranges from 0 to 1023. When reaching 1023, the SFN restarts from 0, i.e., 1024 SFNs form one SFN cycle. With the introduction of the H-SFN concept, 1024 SFNs form one H-SFN, and one H-SFN is 10240 ms=10.24 s. Likewise, the H-SFN ranges from 0 to 1023. When reaching 1023, the H-SFN restarts from 0, and 1024 H-SFNs form one H-SFN cycle.

With the introduction of the eDRX, the occasion that the UE reads paging is represented by (PH, PF, PO). The PH is Paging Hyperframe and represents a hyperframe number at which the paging is located, the PF is Paging Frame and represents a system frame number at which the paging is located, and the PO is Paging Occasion and represents a subframe number at which the paging is located. The (PH, PF, PO) may also be represented as (PH, PTW (PF, PO)). The PTW is Paging Time Window. Hence, there is a need for determination of a hyperframe number (H-SFN) at which the paging is located and the start system frame number (SFN) of the PTW. Further, the H-SFN and the SFN may be determined through the following formulas:

H-SFN mod TeDRX=(UE_ID mod TeDRX), where, UE_ID=IMSI mod 1024; and

SFN=(1024/K)*ieDRX, where, ieDRX=floor (UE_ID/TeDRX) mod K, TeDRX=UE eDRX cycle, K=4.

Figure 5:
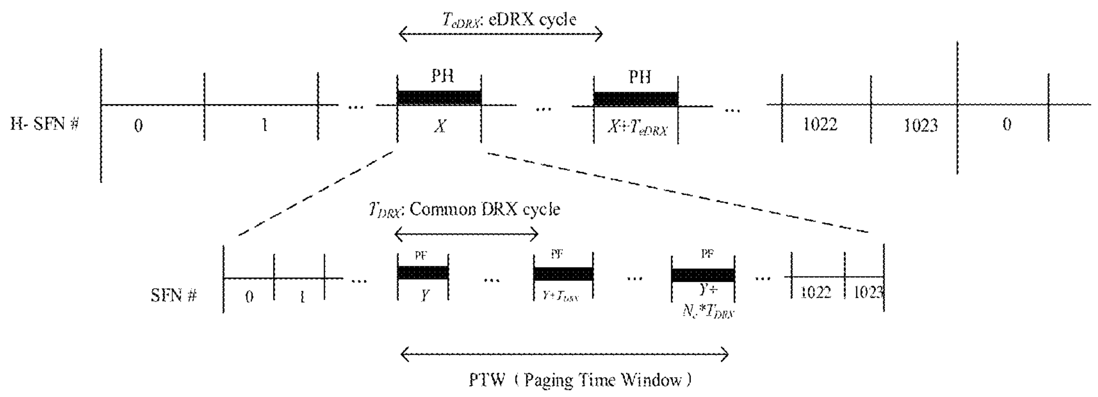
FIG. 5 is a schematic diagram of a Paging Time Window (PTW) according to an embodiment of the present disclosure.

The PF/PO in the PTW may be calculated according to the conventional PF/PO calculation formula and a cell default DRX, which may be referred to FIG. 5.

Figure 6:
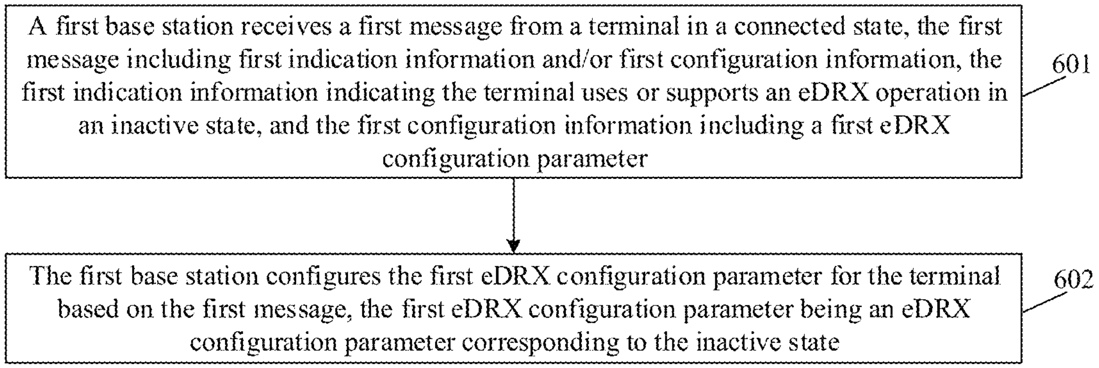
FIG. 6 is a first flowchart of a method for parameter configuration according to an embodiment of the present disclosure.

FIG. 6 is a first flowchart of a method for parameter configuration according to an embodiment of the present disclosure. As shown in FIG. 6, the method for parameter configuration may include the following operations.

At 601: a first base station receives first indication information and/or first configuration information from a terminal device in a connected state, the first indication information indicating the terminal device uses or supports an eDRX operation in an inactive state, and the first configuration information including an eDRX configuration parameter configured by the terminal device.

In the embodiment of the disclosure, the terminal device may be any device capable of communicating with a network device such as a mobile phone, a tablet computer, a notebook computer and a desktop computer.

In the embodiment of the disclosure, the connected state is the RRC_CONNECTED state in the above solutions, and the inactive state is the RRC_INACTIVE state in the above solutions.

In the embodiment of the disclosure, the first base station is a present serving base station of the terminal device. Herein, there are no limits made on the type of the first base station. For example, the first base station may be a gNB, and also for example, the first base station may be a eNB.

In the embodiment of the disclosure, a terminal device may send first indication information and/or first configuration information to a first base station after entering a connected state, the first indication information indicating the terminal device uses or supports an eDRX operation in an inactive state, and the first configuration information including an eDRX configuration parameter configured by the terminal device.

Herein, the terminal device uses the eDRX operation in the inactive state, which refers to that the terminal device may carry out discontinuous reception based on the corresponding eDRX configuration parameter after entering the inactive state.

Herein, the terminal device supports the eDRX operation in the inactive state, which refers to that the terminal device may (can) carry out discontinuous reception based on the corresponding eDRX configuration parameter after entering the inactive state. Supporting the eDRX operation herein represents a capability of the terminal device.

At 602: the first base station configures a first eDRX configuration parameter for the terminal device based on the first indication information and/or the first configuration information, the first eDRX configuration parameter being an eDRX configuration parameter corresponding to the inactive state.

In the embodiment of the disclosure, the content received by the first base station has the following three cases.

First case: the first base station receives the first indication information

The first base station may store the first indication information after receiving the first indication information. The first base station may configure the first eDRX configuration parameter for the terminal device when determining to release the terminal device to enter the inactive state.

Herein, as the first base station may store the first indication information. The first base station may know that the first eDRX configuration parameter is necessarily configured for the terminal device based on the first indication information when determining to release the terminal device to enter the inactive state. It is to be noted that the first indication information enables the network side to know which terminal device is configured with the first eDRX configuration parameter.

Further, the first base station may forward the first indication information to a second base station in response to a switchover occurring to the terminal device. The first base station is a source base station during the switchover, and the second base station is a target base station during the switchover. Therefore, the second base station may configure the first eDRX configuration parameter for the terminal device based on the first indication information.

Second case: the first base station receives the first configuration information The first base station may store the first configuration information after receiving the first configuration information. The first base station may configure the first eDRX configuration parameter for the terminal device based on the first configuration information when determining to release the terminal device to enter the inactive state.

Herein, the terminal device may send a first eDRX configuration parameter desired for use to the first base station through the first configuration information. When determining to release the terminal device to enter the inactive state, the first base station may know, based on the first configuration information, that the eDRX configuration is necessarily configured for the terminal device, and may also know what eDRX configuration parameter is configured for the terminal device (i.e., the first eDRX configuration parameter included in the first configuration information is configured for the terminal device).

Further, the first base station may forward the first configuration information to a second base station in response to a switchover occurring to the terminal device. The first base station is a source base station during the switchover, and the second base station is a target base station during the switchover. Therefore, the second base station may configure the first eDRX configuration parameter for the terminal device based on the first configuration information.

Third case: the first base station receives the first indication information and the first configuration information The first base station may store the first indication information and the first configuration information after receiving the first indication information and the first configuration information. The first base station configures the first eDRX configuration parameter for the terminal device based on the first configuration information when determining to release the terminal device to enter the inactive state.

Such a case is similar to the second case. However, the difference from the second case is that the first message herein not only includes the first configuration information but also includes the first indication information.

Further, the first base station may forward the first indication information and the first configuration information to a second base station in response to a switchover occurring to the terminal device. The first base station is a source base station during the switchover, and the second base station is a target base station during the switchover.

In the embodiment of the disclosure, the first eDRX configuration parameter may at least include: an eDRX cycle and/or a paging window length.

Figure 7:
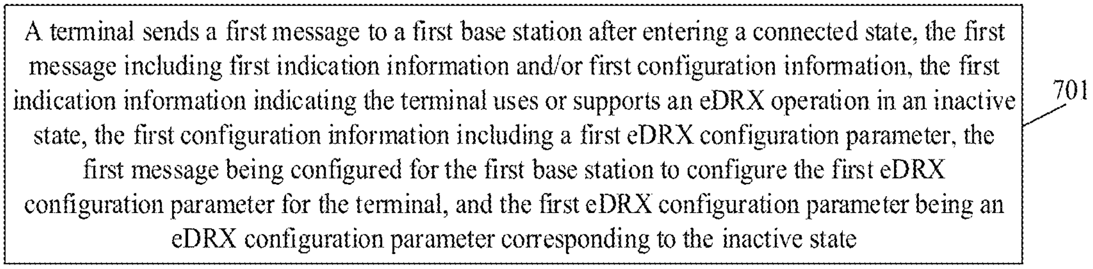
FIG. 7 is a second flowchart of a method for parameter configuration according to an embodiment of the present disclosure.

FIG. 7 is a second flowchart of a method for parameter configuration according to an embodiment of the present disclosure. As shown in FIG. 7, the method for parameter configuration may include the following operation.

At operation 701: a terminal device sends first indication information and/or first configuration information to a first base station after entering a connected state. The first indication information indicates the terminal device uses or supports an eDRX operation in an inactive state, the first configuration information includes an eDRX configuration parameter configured by the terminal device, the first indication information and/or the first configuration information are/is configured for the first base station to configure a first eDRX configuration parameter for the terminal device, and the first eDRX configuration parameter is an eDRX configuration parameter corresponding to the inactive state.

In the embodiment of the disclosure, the terminal device may be any device capable of communicating with a network device such as a mobile phone, a tablet computer, a notebook computer and a desktop computer.

In the embodiment of the disclosure, the connected state is the RRC_CONNECTED state in the above solutions, and the inactive state is the RRC_INACTIVE state in the above solutions.

In the embodiment of the disclosure, the first base station is a present serving base station of the terminal device. Herein, there are no limits made on the type of the first base station. For example, the first base station may be a gNB, and also for example, the first base station may be a eNB.

In the embodiment of the disclosure, a terminal device may send first indication information and/or first configuration information to a first base station after entering a connected state. The first indication information indicates the terminal device uses or supports an eDRX operation in an inactive state, and the first configuration information includes an eDRX configuration parameter configured by the terminal device.

In the embodiment of the disclosure, the first eDRX configuration parameter may at least include: an eDRX cycle and/or a paging window length.

It is to be noted that the operation that the first base station configures the first eDRX configuration parameter for the terminal device based on a first message may refer to the descriptions in the method shown in FIG. 6, and will not be elaborated herein.

Figure 8:
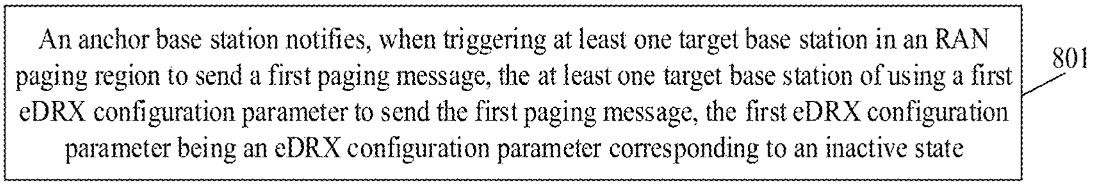
FIG. 8 is a third flowchart of a method for parameter configuration according to an embodiment of the present disclosure.

FIG. 8 is a third flowchart of a method for parameter configuration according to an embodiment of the present disclosure. As shown in FIG. 8, the method for parameter configuration may include the following operation.

At operation 801: an anchor base station notifies, when triggering at least one target base station in an RAN paging region to send first paging scheduling information and/or a first paging message, the at least one target base station of using a first eDRX configuration parameter to send the first paging scheduling information and/or the first paging message. The first eDRX configuration parameter is an eDRX configuration parameter corresponding to an inactive state.

In the embodiment of the disclosure, the anchor base station may be a base station controlling the terminal device to enter the inactive state; or the anchor base station may be a base station storing a context of UE; or the anchor base station may be a last serving base station before the terminal device in the connected state enters the inactive state. Referring to FIG. 2, the anchor base station initializes the first paging message after downlink data reaches the anchor base station, the first paging message being an RAN initial paging message.

In the embodiment of the disclosure, the first eDRX configuration parameter may at least include: an eDRX cycle and/or a paging window length.

Herein, the target base station may support an eDRX operation or not support the eDRX. When the target base station supports an eDRX operation, the first eDRX configuration parameter is used to send the first paging scheduling information and/or the first paging message; or when the target base station does not support an eDRX operation, a minimum DRX configuration parameter of a UE-dedicated DRX configuration parameter and a cell default DRX configuration parameter is used to send the first paging scheduling information and/or the first paging message. It is to be noted that the DRX configuration parameter may at least include: a DRX cycle and/or a paging window length. The comparison in size of the DRX configuration parameter may be a comparison in the DRX cycle and/or the paging window length.

Figure 9:
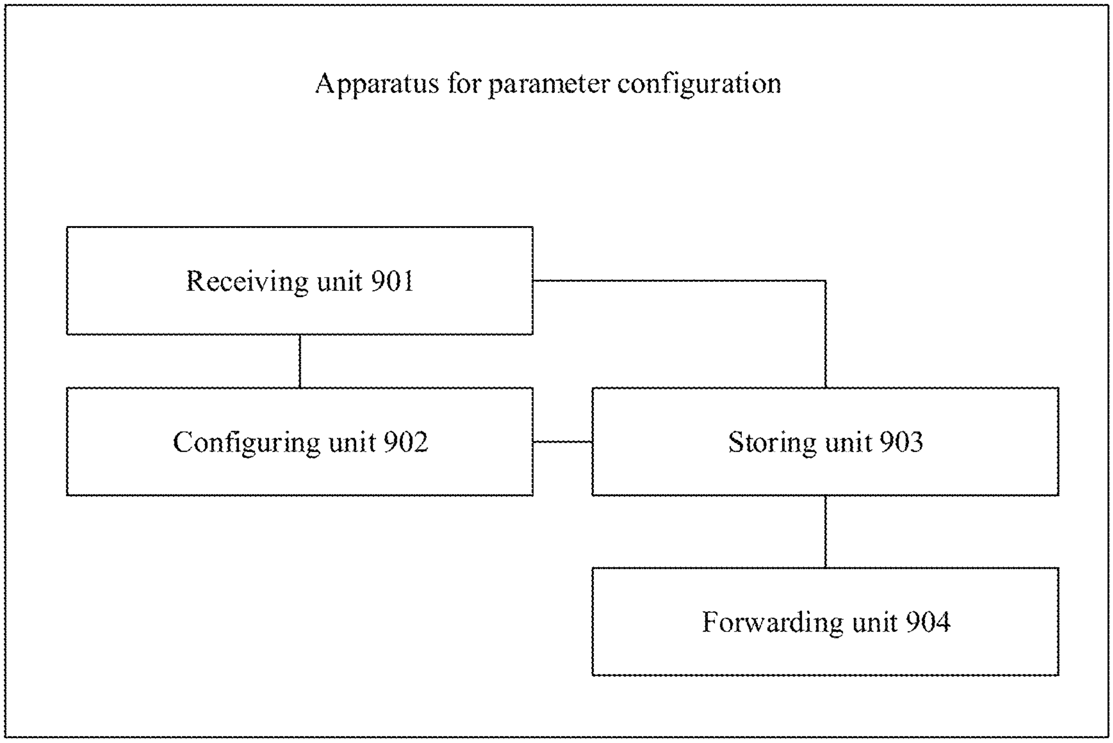
FIG. 9 is a first schematic structural diagram of an apparatus for parameter configuration according to an embodiment of the present disclosure.

FIG. 9 is a first schematic structural diagram of an apparatus for parameter configuration according to an embodiment of the present disclosure. As shown in FIG. 9, the apparatus may include: a receiving unit 901 and a configuring unit 902.

The receiving unit 901 is configured to receive first indication information and/or first configuration information from a terminal device in a connected state, the first indication information indicating the terminal device uses or supports an eDRX operation in an inactive state, and the first configuration information including an eDRX configuration parameter configured by the terminal device.

The configuring unit 902 is configured to configure a first eDRX configuration parameter for the terminal device based on the first indication information and/or the first configuration information, the first eDRX configuration parameter being an eDRX configuration parameter corresponding to the inactive state.

In an implementation, the apparatus may further include a storing unit 903.

The storing unit 903 is configured to store the first indication information.

The configuring unit 902 is configured to configure the first eDRX configuration parameter for the terminal device when determining to release the terminal device to enter the inactive state.

In an implementation, the apparatus may further include a forwarding unit 904.

The forwarding unit 904 is configured to forward the first indication information to a second base station in response to a switchover occurring to the terminal device.

The second base station is a target base station during the switchover.

In an implementation, the apparatus may further include a storing unit 903.

The storing unit 903 is configured to store the first configuration information.

The configuring unit 902 is configured to configure the first eDRX configuration parameter for the terminal device based on the first configuration information when determining to release the terminal device to enter the inactive state.

In an implementation, the apparatus may further include a forwarding unit 904.

The forwarding unit 904 is configured to forward the first configuration information to a second base station in response to a switchover occurring to the terminal device.

The second base station is a target base station during the switchover.

In an implementation, the apparatus may further include a storing unit 903.

The storing unit 903 is configured to store the first indication information and the first configuration information.

The configuring unit 902 is configured to configure the first eDRX configuration parameter for the terminal device based on the first configuration information when determining to release the terminal device to enter the inactive state.

In an implementation, the apparatus may further include a forwarding unit 904.

The forwarding unit 904 is configured to forward the first indication information and the first configuration information to a second base station in response to a switchover occurring to the terminal device.

The second base station is a target base station during the switchover.

In an implementation, the first eDRX configuration parameter may at least includes: an eDRX cycle and/or a paging window length.

It is to be understood by the person skilled in the art that related descriptions on the above apparatus for parameter configuration in the embodiments of the disclosure may be understood with reference to the related descriptions on the method for parameter configuration in the embodiments of the disclosure.

Figure 10:
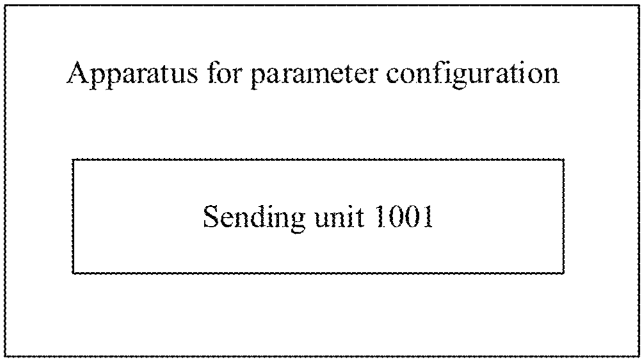
FIG. 10 is a second schematic structural diagram of an apparatus for parameter configuration according to an embodiment of the present disclosure.

FIG. 10 is a second schematic structural diagram of an apparatus for parameter configuration according to an embodiment of the present disclosure. As shown in FIG. 10, the apparatus may include: a sending unit 1001.

The sending unit 1001 is configured to send first indication information and/or first configuration information to a first base station after a terminal device enters a connected state, the first indication information indicating the terminal device uses or supports an eDRX operation in an inactive state, and the first configuration information including an eDRX configuration parameter configured by the terminal device.

The first indication information and/or the first configuration information and/is configured for the first base station to configure a first eDRX configuration parameter for the terminal device, and the first eDRX configuration parameter is an eDRX configuration parameter corresponding to the inactive state.

In an implementation, the first eDRX configuration parameter may at least include: an eDRX cycle and/or a paging window length.

It is to be understood by the person skilled in the art that related descriptions on the above apparatus for parameter configuration in the embodiments of the disclosure may be understood with reference to the related descriptions on the method for parameter configuration in the embodiments of the disclosure.

Figure 11:
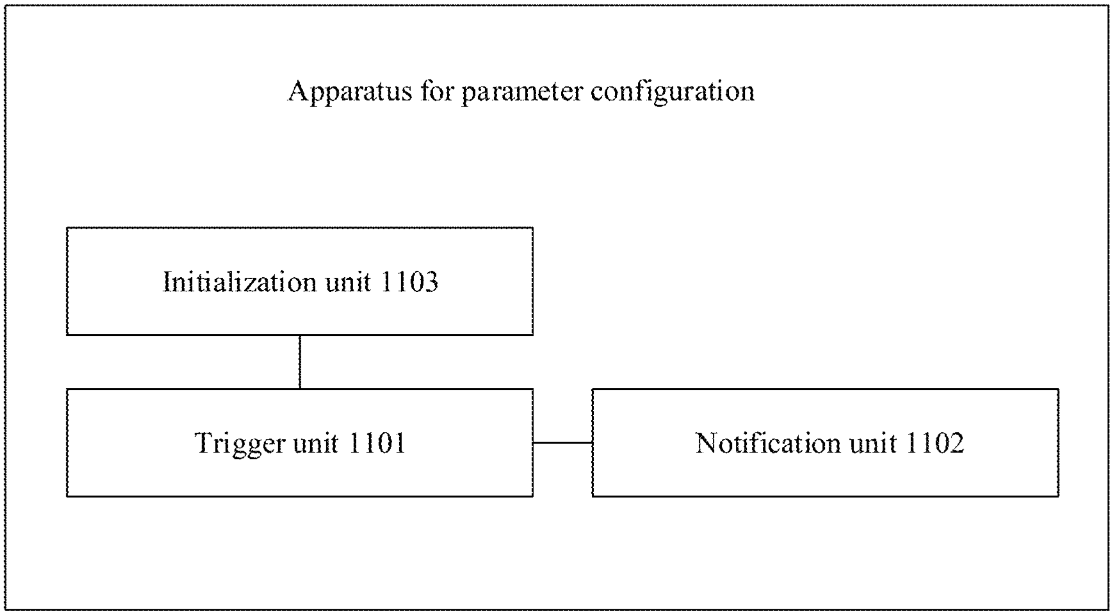
FIG. 11 is a third schematic structural diagram of an apparatus for parameter configuration according to an embodiment of the present disclosure.

FIG. 11 is a third schematic structural diagram of an apparatus for parameter configuration according to an embodiment of the present disclosure. As shown in FIG. 11, the apparatus may include a trigger unit 1101 and a notification unit 1102.

The trigger unit 1101 is configured to trigger at least one target base station in an RAN paging region to send first paging scheduling information and/or a first paging message.

The notification unit 1102 is configured to notify the at least one target base station of using a first eDRX configuration parameter to send the first paging scheduling information and/or the first paging message, the first eDRX configuration parameter being an eDRX configuration parameter corresponding to an inactive state.

In an implementation, when the target base station supports an eDRX operation, the first eDRX configuration parameter is used to send the first paging scheduling information and/or the first paging message; or when the target base station does not support an eDRX operation, a minimum DRX configuration parameter of a UE-dedicated DRX configuration parameter and a cell default DRX configuration parameter is used to send the first paging scheduling information and/or the first paging message.

In an implementation, the apparatus may further include an initialization unit 1103.

The initialization unit 1103 is configured to initialize the first paging message after downlink data reaches the anchor base station, the first paging message being an RAN initial paging message.

In an implementation, the first eDRX configuration parameter may at least include: an eDRX cycle and/or a paging window length.

The apparatus for parameter configuration in the embodiment of the disclosure is applied to the anchor base station. The anchor base station may be a base station controlling the terminal device to enter the inactive state; or the anchor base station may be a base station storing a context of UE; or the anchor base station may be a last serving base station before the terminal device in the connected state enters the inactive state.

It is to be understood by the person skilled in the art that related descriptions on the above apparatus for parameter configuration in the embodiments of the disclosure may be understood with reference to the related descriptions on the method for parameter configuration in the embodiments of the disclosure.

Figure 12:
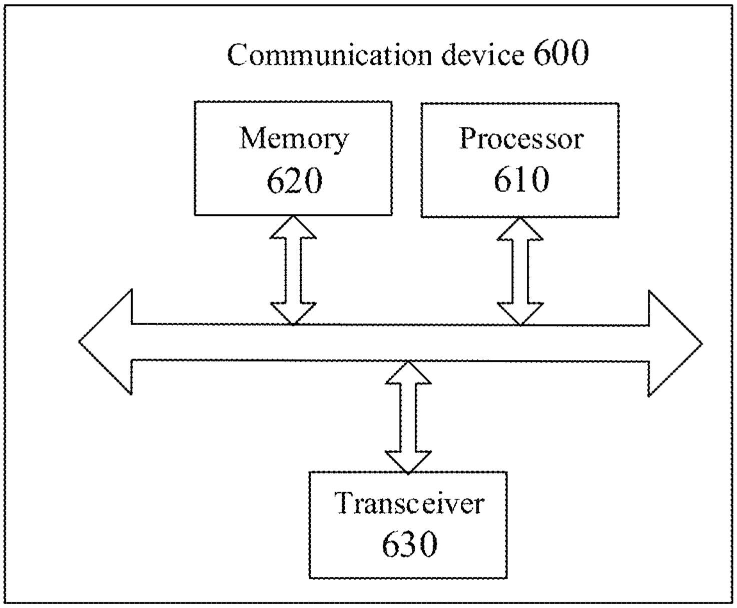
FIG. 12 is a schematic structure diagram of a communication device according to an embodiment of the disclosure.

FIG. 12 is a schematic structure diagram of a communication device 600 according to an embodiment of the disclosure. The communication device may be a terminal device, and may also be a network device. The communication device 600 shown in FIG. 12 includes a processor 610. The processor 610 may call a computer program from memory and run the computer program, to implement the method in an implementation.

In some implementations, as shown in FIG. 12, the communication device 600 may further include memory 620. The processor 610 may call the computer program from the memory 620 and run the computer program to implement the method in an implementation.

The memory 620 may be a separate device independent of the processor 610, and may also be integrated in the processor 610.

In some implementations, as shown in FIG. 12, the communication device 600 may further include a transceiver 630, and the processor 610 may control the transceiver 630 to communicate with another device, sending information or data to the other device or receiving information or data from the other device.

The transceiver 630 may include a transmitter and a receiver. The transceiver 630 may further include an antenna. There may be one or more antennas.

In some implementations, the communication device 600 may be the network device of the embodiments of the disclosure, and the communication device 600 may implement corresponding flows implemented by the network device in each method of the embodiments of the disclosure. For simplicity, elaborations are omitted herein.

In some implementations, the communication device 600 may be the mobile terminal device/terminal device of the embodiments of the disclosure, and the communication device 600 may implement corresponding flows implemented by the mobile terminal device/terminal device in each method of the embodiments of the disclosure. For simplicity, elaborations are omitted herein.

Figure 13:
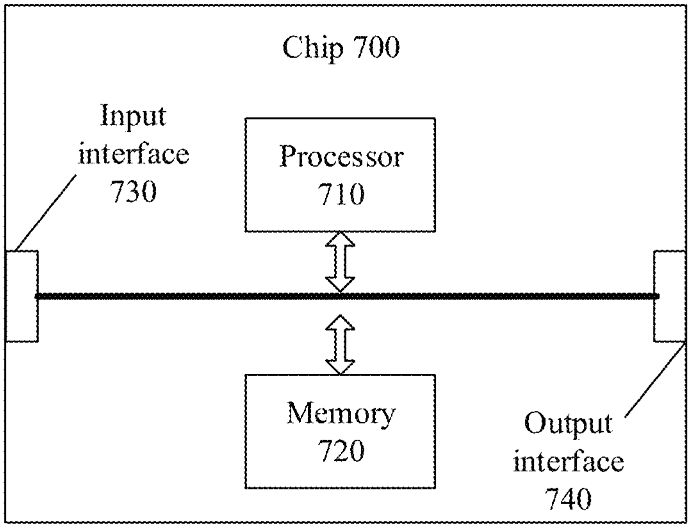
FIG. 13 is a schematic structure diagram of a chip according to an embodiment of the disclosure.

FIG. 13 is a schematic structure diagram of a chip according to an embodiment of the disclosure. The chip 700 shown in FIG. 13 includes a processor 710. The processor 710 may call a computer program from memory and run the computer program to implement the method in an implementation.

In some implementations, as shown in FIG. 13, the chip 700 may further include the memory 720. The processor 710 may call the computer program from the memory 720 and run the computer program, to implement the method in an implementation.

The memory 720 may be a separate device independent of the processor 710, and may also be integrated in the processor 710.

In some implementations, the chip 700 may further include an input interface 730. The processor 710 may control the input interface 730 to communicate with another device or chip to acquire information or data from the another device or chip.

In some implementations, the chip 700 may further include an output interface 740. The processor 710 may control the output interface 740 to communicate with another device or chip to output information or data to the another device or chip.

In some implementations, the chip may be applied to the network device in an implementation, and the chip may implement corresponding flows implemented by the network device in each method of the embodiments of the disclosure. For simplicity, elaborations are omitted herein.

In some implementations, the chip may be applied to the mobile terminal device/terminal device in an implementation, and the chip may implement corresponding flows implemented by the mobile terminal device/terminal device in each method of the embodiments of the disclosure. For simplicity, elaborations are omitted herein.

It is to be understood that the chip mentioned in the embodiments of the disclosure may be a chip, which may also be called a system-level chip, a system chip, a chip system or a system on chip, etc.

Figure 14:
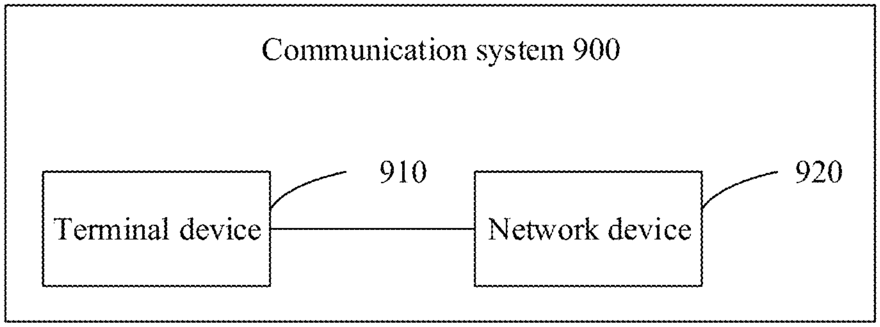
FIG. 14 is a schematic block diagram of a communication system according to an embodiment of the disclosure.

FIG. 14 is a schematic block diagram of a communication system 900 according to an embodiment of the disclosure. As shown in FIG. 14, the communication system 900 includes: a terminal device 910 and a network device 920.

The terminal device 910 may be configured to implement corresponding functions implemented by the terminal device in the above method, and the network device 920 may be configured to implement corresponding functions implemented by the terminal device in the above method. For ease of briefness, details are not elaborated.

It is to be understood that the processor in the embodiment of the disclosure may be an integrated circuit chip and has a signal processing capability. In an implementation process, each operation of the method embodiment may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in an implementation may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM and a register. The storage medium is located in memory, and the processor reads information in the memory, and completes the operations of the methods in combination with hardware.

It can be understood that the memory in an implementation may be a volatile memory or a nonvolatile memory, or may include both the volatile and nonvolatile memories. The nonvolatile memory may be an ROM, a Programmable ROM (PROM), an Erasable PROM (EPROM), an Electrically EPROM (EEPROM) or a flash memory. The volatile memory may be an RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the above memory is exemplarily but unlimitedly described. For example, the memory in an implementation may further be a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM), etc. In other words, the memory described in an implementation includes but not limited to these and any other appropriate types of memories.

The embodiments of the disclosure also provide a computer-readable storage medium, which is configured to store a computer program.

In some implementations, the computer-readable storage medium may be applied to a network device in an implementation, and the computer program enables a computer to execute corresponding flows implemented by the network device in each method of the embodiments of the disclosure. For simplicity, elaborations are omitted herein.

In some implementations, the computer-readable storage medium may be applied to a mobile terminal device/terminal device in an implementation, and the computer program enables a computer to execute corresponding flows implemented by the mobile terminal device/terminal device in each method of the embodiments of the disclosure. For simplicity, elaborations are omitted herein.

The embodiments of the disclosure also provide a computer program product, which includes a computer program instruction.

In some implementations, the computer program product may be applied to a network device in an implementation, and the computer program instruction enables a computer to execute corresponding flows implemented by the network device in each method of the embodiments of the disclosure. For simplicity, elaborations are omitted herein.

In some implementations, the computer program product may be applied to a mobile terminal device/terminal device in an implementation, and the computer program instruction enables the computer to execute corresponding flows implemented by the mobile terminal device/terminal device in each method of the embodiments of the disclosure. For simplicity, elaborations are omitted herein.

The embodiments of the disclosure also provide a computer program.

In some implementations, the computer program may be applied to a network device in an implementation, and the computer program runs in a computer to enable the computer to execute corresponding flows implemented by the network device in each method of the embodiments of the disclosure. For simplicity, elaborations are omitted herein.

In some implementations, the computer program may be applied to a mobile terminal device/terminal device in an implementation, and the computer program runs in the computer to enable the computer to execute corresponding flows implemented by the mobile terminal device/terminal device in each method of the embodiments of the disclosure. For simplicity, elaborations are omitted herein.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific disclosures and design constraints of the technical solutions. Professionals may realize the described functions for each specific disclosure by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disc.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subjected to the scope of protection of the claims.

The invention claimed is:

1. A communication method, comprising:

receiving, by a first base station, first indication information from a terminal device in a connected state, wherein the first indication information indicates that the terminal device supports an extended Discontinuous Reception (eDRX) operation in an inactive state, and the terminal device supporting the eDRX operation in the inactive state indicates that the terminal device has a capability of carrying out discontinuous reception based on a first eDRX configuration parameter; and configuring, by the first base station, the first eDRX configuration parameter for the terminal device when determining to release the terminal device to enter the inactive state, the first eDRX configuration parameter being an eDRX configuration parameter corresponding to the inactive state.

2. The method of claim 1, further comprising:

forwarding, by the first base station, the first indication information to a second base station in response to a switchover occurring to the terminal device, wherein the first base station is a source base station during the switchover, and the second base station is a target base station during the switchover.

3. The method of claim 1, wherein notifying, by the first base station, when triggering at least one second base station in a Radio Access Network (RAN) paging region to send at least one of first paging scheduling information or a first paging message, the at least one second base station of using the first eDRX configuration parameter to send the at least one of the first paging scheduling information or the first paging message.

4. The method of claim 1, wherein the first eDRX configuration parameter at least comprises: at least one of an eDRX cycle or a paging window length.

5. The method of claim 1, wherein the first base station is a base station controlling the terminal device to enter the inactive state;

the first base station is a base station storing User Equipment (UE) context; and the first base station is a last serving base station before the terminal device in the connected state enters the inactive state.

6. A communication method, comprising:

sending, by a terminal device, first indication information to a first base station after entering a connected state, wherein the first indication information indicates that the terminal device supports an extended Discontinuous Reception (eDRX) operation in an inactive state, and the terminal device supporting the eDRX operation in the inactive state indicates that the terminal device has a capability of carrying out discontinuous reception based on a first eDRX configuration parameter;

wherein the first indication information is configured for the first base station to configure the first eDRX configuration parameter for the terminal device, and the first eDRX configuration parameter is an eDRX configuration parameter corresponding to the inactive state;

wherein the method further comprises:

carrying out, by the terminal device, discontinuous reception based on the first eDRX configuration parameter after entering the inactive state.

7. The method of claim 6, further comprising:

receiving, by the terminal device, based on the first eDRX configuration parameter, at least one of first paging scheduling information or a first paging message from at least one second base station in a Radio Access Network (RAN) paging region of using the first eDRX configuration parameter, wherein the at least one of the first paging scheduling information or the first paging message is sent by the at least one second base station in the RAN paging region that is notified by the first base station when the at least one second base station being triggered to send the at least one of the first paging scheduling information or the first paging message.

8. The method of claim 6, wherein the first eDRX configuration parameter at least comprises: at least one of an eDRX cycle or a paging window length.

9. The method of claim 6, wherein the first base station is a base station controlling the terminal device to enter the inactive state;

the first base station is a base station storing User Equipment (UE) context; and the first base station is a last serving base station before the terminal device in the connected state enters the inactive state.

10. The method of claim 6, wherein the connected state is a Radio Resource Control connected (RRC_CONNECTED) state, and the inactive state is a RRC inactive (RRC_INACTIVE) state.

11. A terminal device, comprising:

a processor; and a memory configured to store a computer program;

wherein the processor is configured to call and run the computer program stored in the memory to cause the terminal device to:

send first indication information to a first base station after the terminal device entering a connected state, wherein the first indication information indicates that the terminal device supports an extended Discontinuous Reception (eDRX) operation in an inactive state, and the terminal device supporting the eDRX operation in the inactive state indicates that the terminal device has a capability of carrying out discontinuous reception based on a first eDRX configuration parameter;

wherein the first indication information is configured for the first base station to configure the first eDRX configuration parameter for the terminal device, and the first eDRX configuration parameter is an eDRX configuration parameter corresponding to the inactive state;

wherein the processor is further configured to call and run the computer program stored in the memory to cause the terminal device to: carry out discontinuous reception based on the first eDRX configuration parameter after entering the inactive state.

12. The terminal device of claim 11, wherein the processor is further configured to call and run the computer program stored in the memory to cause the terminal device to: receive, based on the first eDRX configuration parameter, at least one of first paging scheduling information or a first paging message from at least one second base station in a Radio Access Network (RAN) paging region of using the first eDRX configuration parameter, wherein the at least one of the first paging scheduling information or the first paging message is sent by the at least one second base station in the RAN paging region that is notified by the first base station when the at least one second base station being triggered to send the at least one of the first paging scheduling information or the first paging message.

13. The terminal device of claim 11, wherein the first eDRX configuration parameter at least comprises: at least one of an eDRX cycle or a paging window length.

14. The terminal device of claim 11, wherein the connected state is a Radio Resource Control connected (RRC_CONNECTED) state, and the inactive state is a RRC inactive (RRC_INACTIVE) state.

15. The terminal device of claim 11, wherein the first base station is a base station controlling the terminal device to enter the inactive state;

the first base station is a base station storing User Equipment (UE) context; and the first base station is a last serving base station before the terminal device in the connected state enters the inactive state.

16. A first base station, comprising:

a processor; and a memory configured to store a computer program;

wherein the processor is configured to call and run the computer program stored in the memory to cause the first base station to perform the communication method of claim 1.

* * * * *